United States Patent
Mourning et al.

(10) Patent No.: US 9,756,280 B2
(45) Date of Patent: Sep. 5, 2017

(54) REDUCTION OF SENSOR CAPTURED DATA STREAMED TO AN OPERATOR

(71) Applicant: Ohio University, Athens, OH (US)

(72) Inventors: Chad Lee Mourning, Middleport, OH (US); Scott Larson Nykl, Athens, OH (US)

(73) Assignee: Ohio University, Athens, OH (US)

( * ) Notice: Subject to any disclaimer, the term of this patent is extended or adjusted under 35 U.S.C. 154(b) by 0 days.

(21) Appl. No.: 14/768,106

(22) PCT Filed: Feb. 21, 2014

(86) PCT No.: PCT/US2014/017695
§ 371 (c)(1),
(2) Date: Aug. 14, 2015

(87) PCT Pub. No.: WO2014/130815
PCT Pub. Date: Aug. 28, 2014

(65) Prior Publication Data
US 2015/0381927 A1    Dec. 31, 2015

Related U.S. Application Data

(60) Provisional application No. 61/767,881, filed on Feb. 22, 2013.

(51) Int. Cl.
*H04N 9/88* (2006.01)
*H04N 5/926* (2006.01)
(Continued)

(52) U.S. Cl.
CPC ..... *H04N 5/9261* (2013.01); *G06F 17/30061* (2013.01); *G06K 9/00476* (2013.01);
(Continued)

(58) Field of Classification Search
CPC .... H04N 5/9261; H04N 7/183; G06T 15/005; G06T 17/05; G06T 19/20; G06T 19/003;
(Continued)

(56) References Cited

U.S. PATENT DOCUMENTS 6,760,488 B1 *  7/2004  Moura ................ G06T 7/0071
                                                           345/419
7,583,275 B2 *  9/2009  Neumann ............... G06T 17/00
                                                           345/419
(Continued)

OTHER PUBLICATIONS

International Search Report and Written Opinion from the International Searching Authority in Application No. PCT/US2014/017695, mailing date Aug. 12, 2014, 13 pages.
(Continued)

*Primary Examiner* — David Harvey
(74) *Attorney, Agent, or Firm* — Wood Herron & Evans LLP (57) ABSTRACT

Systems, methods and computer storage mediums reduce an amount of data captured by a plurality of sensors on a vehicle that is streamed to an operator of the vehicle. Embodiments relate to processing the real-time data captured by the plurality of sensors so that required real-time data that is necessary for the operator to adequately monitor the target area is streamed in real-time to the operator while discarding the unnecessary real-time data. The discarded real-time data is replaced by a three-dimensional virtual model that is a virtual representation of the target area. The three-dimensional virtual model is generated based on previously captured data of the target area. The processed real-time data required by the operator is integrated into the three-dimensional virtual model. The processed real-time data that is integrated into the three-dimensional virtual model is streamed to the operator.

21 Claims, 3 Drawing Sheets

(51) Int. Cl.
| | |
|---|---|
| *G06T 17/05* | (2011.01) |
| *G06T 19/20* | (2011.01) |
| *G06F 17/30* | (2006.01) |
| *G06K 9/00* | (2006.01) |
| *G06T 11/60* | (2006.01) |
| *G06T 15/00* | (2011.01) |
| *H04N 7/18* | (2006.01) |
| *H04N 21/2343* | (2011.01) |
| *H04N 21/2662* | (2011.01) |
| *H04N 21/2665* | (2011.01) |
| *H04N 21/4728* | (2011.01) |
| *H04N 19/167* | (2014.01) |

(52) U.S. Cl.
CPC .......... *G06T 11/60* (2013.01); *G06T 15/005* (2013.01); *G06T 17/05* (2013.01); *G06T 19/20* (2013.01); *H04N 7/183* (2013.01); *G06T 2219/2021* (2013.01); *H04N 19/167* (2014.11); *H04N 21/2343* (2013.01); *H04N 21/2662* (2013.01); *H04N 21/2665* (2013.01); *H04N 21/4728* (2013.01)

(58) Field of Classification Search
CPC .......... G06F 17/30061; G05D 1/0038; G05D 2201/0207; G06K 9/00771
USPC .......................................... 386/263
See application file for complete search history.

(56) References Cited

U.S. PATENT DOCUMENTS

| | | | | |
|---|---|---|---|---|
| 8,457,401 | B2* | 6/2013 | Lipton | G06K 9/00771 |
| | | | | 382/173 |
| 8,774,950 | B2* | 7/2014 | Kelly | G05B 23/0267 |
| | | | | 700/65 |
| 8,855,442 | B2* | 10/2014 | Owechko | 345/419 |
| 9,519,286 | B2* | 12/2016 | Lacaze | G05D 1/0038 |
| 2003/0147553 | A1* | 8/2003 | Chen | G01C 11/04 |
| | | | | 382/154 |
| 2008/0170751 | A1* | 7/2008 | Lei | G06T 7/215 |
| | | | | 382/103 |
| 2009/0060321 | A1* | 3/2009 | Gillard | G06K 9/00624 |
| | | | | 382/154 |
| 2009/0276105 | A1* | 11/2009 | Lacaze | G05D 1/0044 |
| | | | | 701/2 |
| 2009/0295791 | A1* | 12/2009 | Aguera y Arcas | G06T 15/205 |
| | | | | 345/419 |
| 2011/0043627 | A1 | 2/2011 | Werling et al. | |
| 2012/0019522 | A1 | 1/2012 | Lawrence et al. | |
| 2013/0009950 | A1 | 1/2013 | Ben-David et al. | |
| 2013/0215221 | A1* | 8/2013 | Wang | G06T 7/00 |
| | | | | 348/43 |
| 2013/0259376 | A1* | 10/2013 | Louban | G06T 7/606 |
| | | | | 382/173 |

OTHER PUBLICATIONS

Hui Cheng et al., "Adaptive Region of Interest Estimation for Aerial Surveillance Video", Image Processing, 2005. ICIP 2005. IEEE International Conference on, IEEE, Piscataway, NJ, USA, IEEE, vol. 3, Sep. 11, 2005, pp. 860-863, XP010851527.

Neumann U. et al., "Augmented virtual environments (AVE): dynamic fusion of imagery and 3D models", Proceedings IEEE 2003 Virtual Reality (VR). Los Angeles, CA, Mar. 22-26, 2003, Los Alamitos, CA: IEEE Comp. Soc., US, Mar. 22, 2003, pp. 61-67, XP010637612.

Jonathan Fournier et al., "Immersive virtual environment for mobile platform remote operation and exploration", Robotic and Sensors Environments (ROSE) 2011 IEEE International Symposium on, IEEE, Sep. 17, 2001, pp. 37-42, XP031961277.

Gloria L. Calhoun, et al, "Synthetic vision system for improving unmanned aerial vehicle operator situation awareness", May 1, 2005, Enhanced and Synthetic Vision, SPIE, pp. 219-230, XP009168010.

Chang S-F et al., "Video Adaptation: Concepts, Technologies, and Open Issues", Proceedings of the IEEE, New York, US, vol. 93, No. 1, Jan. 1, 2005, pp. 148-158, XP011123860.

* cited by examiner

REDUCTION OF SENSOR CAPTURED DATA STREAMED TO AN OPERATOR

CROSS-REFERENCE TO RELATED APPLICATIONS

This application claims priority to International Patent Application No. PCT/US14/17695, filed Feb. 21, 2014 (pending), which claims the benefit of U.S. Application No. 61/767,881 filed on Feb. 22, 2013, which is incorporated herein by reference in its entirety.

BACKGROUND

An airborne vehicle equipped with electro-optical sensors flies over a target area to capture real-time video footage of the target area so that an operator of the vehicle can monitor the target area. The real-time video footage is streamed from the electro-optical sensors to the operator so that the operator can watch the streaming video of the target area in real-time. For example, an unmanned aerial vehicle (UAV) streams real-time video footage of an area to the operator who is monitoring the area for illegal activity.

The streaming of real-time video footage from the electro-optical sensors to the operator occupies a significant portion of bandwidth for the communications network of the airborne vehicle. A communications network that is sufficiently robust to support the streaming of the real-time video footage is expensive while occupying a significant portion of space in the airborne vehicle and/or adding significant weight to the airborne vehicle. A significant portion of the real-time video footage streamed to the operator is redundant and is unnecessary for the operator to adequately monitor the target area. Thus, valuable bandwidth, space, size, cooling, weight, and/or power (SCWaP) for the airborne vehicle are apportioned to accommodate unnecessary real-time video footage. Further, airborne and/or ground based transmitters that have the capability to stream real-time video footage captured by the electro-optical sensors to the operator are also quite expensive and thus adding significant amount of unnecessary cost to the system.

For example, the operator may analyze real-time data and/or stored data processed by a conventional computing device via a conventional display. The conventional computing device may stream data in real-time from a conventional sensor system to the operator as the data is captured by the conventional sensor system. Substantially all of the data captured by the conventional sensor system is streamed in real-time by the conventional computing device to the operator. Streaming substantially all of the data captured by the conventional sensor system in real-time to the operator requires a significant amount of bandwidth to be provided by a conventional network for the operator to adequately monitor the target area. Equipping the conventional network to adequately stream substantially all of the data captured by the conventional sensor system in real-time to the operator for the operator to adequately monitor the target area is a costly endeavor. Further equipping the conventional network to adequately stream substantially all of the data captured by the conventional sensor system requires additional antennas, larger antennas, larger transceivers, additional cooling devices, and/or additional power devices.

Failing to equip the conventional network to adequately stream substantially all of the data captured by the conventional sensor system in real-time to the operator for the operator to adequately monitor the target area increases the risk that the conventional network may fail to transmit the required data in a sufficient amount of time while streaming the data. Failing to transmit the required data in a sufficient amount of time by the conventional network may result in lost data that is not streamed to the operator. The conventional computing device does not have control of the data that is lost during the transmission failure of the conventional network. Substantially all of the data captured by the conventional sensor system during the transmission failure of the conventional network is lost regardless of whether the data is required by the operator to adequately monitor the target area. Thus, data required by the operator to adequately monitor the target area may very well be lost during the transmission failure of the conventional network. As a result, the operator may not be able to adequately monitor the target area when the conventional network fails to transmit the required data in a sufficient amount of time.

The conventional computing device may store data captured by the conventional sensor system to be analyzed by the operator. Storing substantially all of the data captured by the conventional sensor system requires a significant amount of additional storage devices to be placed on the vehicle. The vehicle may not have the physical capacity for the additional devices such that additional devices cannot be installed on the vehicle. Failure to install the additional devices may result in lost data captured by the conventional sensor system that may compromise the ability of the operator to adequately monitor the target area. The addition of the devices may occupy valuable space on the vehicle that may be otherwise utilized for more valuable equipment such as additional sensors. For example, replacing additional sensors with the devices noted above decreases the quantity of data captured by the conventional sensor system and provided to the operator. The decrease in the quantity of data captured by the conventional sensor system may compromise the ability of the operator to monitor the target area adequately. The additional equipment also increases the weight added to the vehicle, takes up additional space in the vehicle, and/or uses more power which adds significant cost and/or difficulty in capturing the data for the operator.

BRIEF SUMMARY

Embodiments of the present disclosure relate to reducing bandwidth occupied by the streaming of data in real-time captured by sensors of a vehicle to an operator who is monitoring a target area. In an embodiment, a method reduces an amount of data captured by at least one of a plurality of sensors located on a vehicle that is streamed to an operator of the vehicle. Previously captured data of a target area may be retrieved from a previously captured data database. The previously captured data depicts an actual representation of the target area when the previously captured data was captured. A three-dimensional virtual model of the target area may be generated from the previously captured data. The three-dimensional virtual model may be a virtual representation of the target area. Real-time data of the target area may be captured by the plurality of sensors located on the vehicle. The real-time data provides the actual representation of the target area in real-time. The captured real-time data may be processed to distinguish required real-time data that satisfies a plurality of process parameters from unnecessary real-time data that fails the plurality of process parameters. The required real-time data may be integrated into the three-dimensional virtual model. Only the required real-time data integrated into the three-dimensional virtual model may be streamed to the operator of the vehicle.

In an embodiment, a system reduces the amount of data captured by at least one of a plurality of sensors located on a vehicle that may be streamed to an operator of the vehicle. A retrieving module is configured to retrieve previously captured data of a target area from a previously captured data database. The previously captured data depicts an actual representation of the target area when the previously captured data was captured. A generation module is configured to generate a three-dimensional virtual model of the target area from the previously captured data. The three-dimensional virtual model may be a virtual representation of the target area. A capturing module is configured to capture real-time data of the target area captured by the plurality of sensors located on the vehicle. The real-time data provides the actual representation of the target area in real-time. A processing module is configured to process the captured real-time data to distinguish required real-time data that satisfies a plurality of process parameters from unnecessary real-time data that fails the plurality of process parameters. An integration module is configured to integrate the required real-time data into the three-dimensional virtual model. A streaming module is configured to stream only the required real-time data integrated into the three-dimensional virtual model to the operator of the vehicle.

In an embodiment, a computer storage medium within a computer program where the program comprises instructions that when executed by one or more processors cause the one or more processors to perform operations to reduce an amount of data captured by a plurality of sensors located on a vehicle that is streamed to an operator of the vehicle. Previously captured data of a target area may be retrieved from a previously captured data database. The previously captured data may depict an actual representation of the target area when the previously captured data was captured. A three-dimensional virtual model of the target area may be generated from the previously captured data. The three-dimensional virtual model may be a virtual representation of the target area. The real-time data of the target area may be captured by the plurality of sensors located on the vehicle. The real-time data may provide an actual representation of the target area in real-time. The captured real-time data may be processed to distinguish required real-time data that satisfies a plurality of process parameters from unnecessary real-time data that fails the plurality of process parameters. The required real-time data may be integrated into the three-dimensional virtual model. Only the required real-time data integrated into the three-dimensional virtual model may be streamed to the operator of the vehicle.

Further embodiments, features, and advantages, as well as the structure and operation of the various embodiments, are described in detail below with reference to the accompanying drawings.

BRIEF DESCRIPTION OF THE DRAWINGS/FIGURES

Embodiments are described with reference to the accompanying drawings. In the drawings, like reference numbers may indicate identical or functionally similar elements.

DETAILED DESCRIPTION

The disclosure generally relates to reduction of data that is streamed. In an example embodiment, data captured by sensors located on a vehicle that is streamed to an operator of the vehicle is reduced. An operator may be operating the vehicle to monitor a target area. The operator may monitor the target area based on real-time data captured by the sensors located on the vehicle as the vehicle maneuvers through the target area. The real-time data may provide an actual representation of the target area in real-time. Rather than stream in real-time the real-time data captured by the sensors in its entirety to the operator, the real-time data may be processed so that only the real-time data that may be required by the operator to adequately monitor the target area may be streamed to the operator.

The discarded real-time data captured by the sensors that is not required by the operator to adequately monitor the target area may be replaced with a three-dimensional virtual model. The three-dimensional virtual model of the target area may be a virtual representation of the target area. The three-dimensional virtual model may be generated from previously captured data of the target area. The previously captured data of the target area may depict an actual representation of the target area at the time when the previously captured data of the target area was captured. The processed real-time data required by the operator to adequately monitor the target area may be integrated with the three-dimensional virtual model of the target area. The processed real-time data integrated with the three-dimensional virtual model may be streamed to the operator so that the operator may adequately maneuver the vehicle throughout the target area while monitoring the target area.

In the Detailed Description herein, references to "one embodiment", "an embodiment", an "example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic may be described in connection with an embodiment, it may be submitted that it may be within the knowledge of one skilled in the art to affect such feature, structure, or characteristic in connection with other embodiments whether or not explicitly described.

The following detailed description refers to the accompanying drawings that illustrate exemplary embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the detailed description is not meant to limit the embodiments described below.

System Overview

Figure 1:
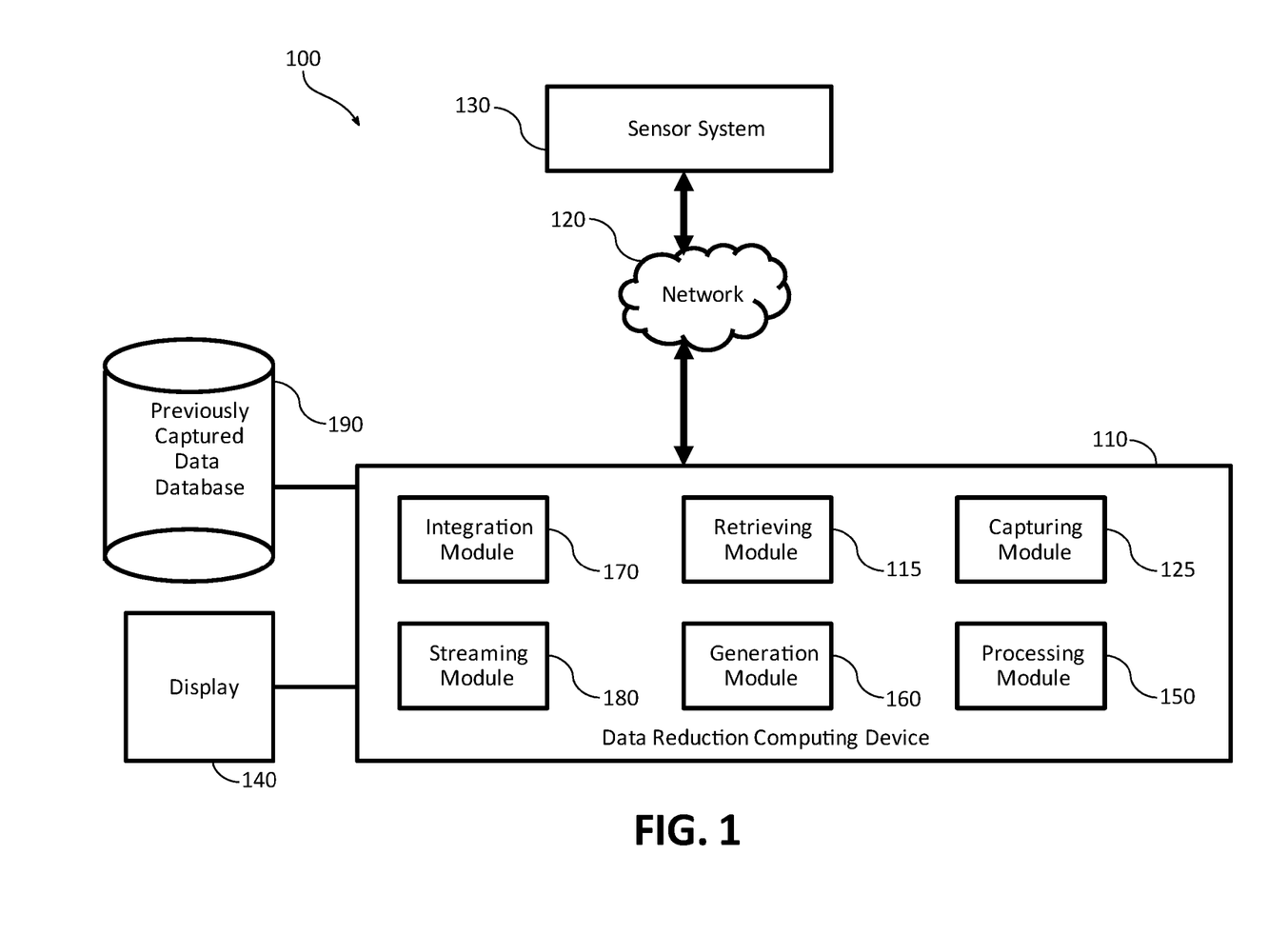
FIG. 1 depicts a detailed view of an exemplary data streaming reduction configuration for reducing an amount of data streamed in real-time.

FIG. 1 depicts a detailed view of an exemplary data streaming reduction configuration 100 for reducing an amount of data streamed in real-time. Data streaming reduction configuration 100 includes network 120, sensor system 130, display 140, data reduction computing device 110, and previously captured data database 190. Data streaming reduction configuration 100 includes a retrieving module 115, a generation module 160, a capturing module 125, a processing module 150, an integration module 170, and a streaming module 180.

One or more sensor systems 130 may connect to one or more data reduction computing devices 110 via network 120. Sensor system 130 may include a data acquisition system, a data management system, intranet, conventional web server, e-mail server, or file transfer server modified according to one embodiment. Sensor system 130 is typically a device that includes a processor, a memory, and a network interface, hereinafter referred to as a computing device or simply "computer."

Sensor system 130 may include one or more sensors that capture data. Sensor system 130 may also include a video imaging system, an infrared imaging system, a photographic imaging system, an air sensing system, a thermal sensing system, and/or any other type of sensing system that includes sensors that will be apparent to those skilled in the relevant art(s) without departing from the spirit and scope of the present disclosure. Sensor system 130 may also include tracking capabilities. Sensor system 130 may be able to detect any movement by an object and then track the object as the object moves. For example, sensor system 130 detects a car moving on the ground. Sensor system 130 then tracks the movement of the car on the ground.

Sensor system 130 may be coupled to a vehicle that maneuvers through a target area to capture data from the target area. The target area may be a geographical area of interest that an operator of the vehicle may desire to monitor with sensor system 130. The target area may include a rural farming field, an urban neighborhood, a forest, an air strip, a no-fly zone, an oil field, a mountain, a body of water and/or any other geographic area that the operator may desire to monitor with sensor system 130 that will be apparent to those skilled in the relevant art(s) without departing from the spirit and scope of the present disclosure. The data captured by sensor system 130 may include buildings, trees, power lines, natural gas pumps, birds, vehicles, people, temperature, physical terrain included in the target area, and/or any data that may be captured from the target area that will be apparent to those skilled in the relevant art(s) without departing from the spirit and scope of the present disclosure. The vehicle that sensor system 130 may be coupled to may be an airplane, a helicopter, a UAV, a remotely piloted aircraft (RPA), a satellite, terrestrial vehicles such as unmanned construction and/or mining vehicles, marine vehicles such as submarines, and/or any other type of vehicle used to gather data from a target area that will be apparent from those skilled in the relevant art(s) without departing from the spirit and scope of the present disclosure. The operator may operate the vehicle directly when physically present within the vehicle and/or remotely from a location independent from the vehicle.

For example, sensor system 130 is coupled to a UAV for the purpose of gathering surveillance data from an urban neighborhood that has a high level of drug trafficking that takes place in the urban neighborhood. The operator of the UAV maneuvers the UAV through the urban neighborhood in search for illegal activity related to drug trafficking. The operator monitors a video feed of the urban neighborhood as captured by the video imaging system included in sensor system 130 for the illegal activity.

In an embodiment, sensor system 130 may stream the captured data to the operator operating the vehicle remotely via network 120. Network 120 includes one or more networks, such as the Internet. In some embodiments of the present invention, network 120 may include one or more wide area networks (WAN) or local area networks (LAN). Network 120 may utilize one or more network technologies such as Ethernet, Fast Ethernet, Gigabit Ethernet, virtual private network (VPN), remote VPN access, a variant of IEEE 802.11 standard such as Wi-Fi, point-to-point link, point-to-multipoint link, cellular Third Generation (3G) wireless network, cellular Fourth Generation (4G) wireless network, and the like. Communication over network 120 takes place using one or more network communication protocols including reliable streaming protocols such as transmission control protocol (TCP), best effort connectionless protocols such as user datagram protocol (UDP), satellite links, and/or radio links. These examples are illustrative and not intended to limit the present invention so that any electromagnetic propagation signal through any medium that conveys information relevant to the specific application may be implemented. In another embodiment, sensor system 130 may stream the captured data directly to the operator who is physically present within the vehicle via a wired connection such as but not limited to a fiber optic connection, a coaxial cable connection, a copper cable connection, and/or any other direct wired connection that will be apparent from those skilled in the relevant art(s) without departing from the spirit and scope of the present disclosure.

Data reduction computing device 110 may be any type of processing (or computing device) as described above. For example, data reduction computing device 110 may be a workstation, mobile device, computer, cluster of computers, set-top box, or other computing device. In an embodiment, multiple modules may be implemented on the same computing device. Such a computing device may include software, firmware, hardware, or a combination thereof. Software may include one or more application on an operating system. Hardware can include, but is not limited to, a processor, memory, and/or graphical user interface display.

Data reduction computing device 110 may process the data captured by sensor system 130 into a stored video feed, stored still-frame photographs, stored air quality levels, stored temperature levels, stored magnetic field levels and/or any other stored data that will be apparent from those skilled in the relevant art(s) without departing from the spirit and scope of the present disclosure.

Data reduction computing device 110 may also include a conventional web server, e-mail server, or file transfer server configured to provide functions of the various embodiments of the present disclosure. Data reduction computing device 110 may be implemented as a client that includes a browser. The browser implemented on data reduction computing device 110 may be but is not limited to a FIREFOX, SAFARI, or INTERNET EXPLORER browser. The components of the browser may be downloaded from a server, such as a web server, and run with the browser. For example, the components of the browser may be Hypertext Markup Language (HTML), JavaScript, or a plug-in, perhaps running native code.

Display 140 displays the target area. The target area may be formatted by display 140 based on graphic processing units associated with display 140 so that the target area is displayed using three-dimensional accelerated contexts. Display 140 may also display the target area in an orthographic projection mode, a perspective projection mode and/or any other type of projection mode that will be apparent from those skilled in the relevant art(s) without departing from the spirit and scope of the present disclosure. Display 140 can be any type of display device including but not limited to a touch screen display, a cathode ray tube (CRT) monitor, a liquid crystal display (LCD) screen, and/or any other type of display that will be apparent from those skilled in the relevant art(s) without departing from the spirit and scope of the present disclosure.

Data reduction computing device 110, sensor system 130 and previously captured data database 190 may share resources via network 120. For example, data reduction computing device 110 may retrieve previously captured data of the target area from previously captured data database 190. Sensor system 130 may also provide previously captured data of the target area to previously captured data database 190 via network 120. Based on the cloud computing configuration, the interaction between data reduction computing device 110, sensor system 130 and previously captured data database 190 may not be limited to a single computing device. For example, a plurality of computing devices may update previously captured data database 190 via network 120 with previously captured data of the target area.

Modules as described below may be used by data reduction computing device 110. Examples of functionality performed by each module are referenced in the below discussion. However, the below references are examples and are not limiting. The functionality of each module may be performed individually by each module and/or be shared among any combination of modules. As referred to herein, a module may be any type of processing (or computing) device having one or more processors. For example, a module can be an individual processor, workstation, mobile device, computer, cluster of computers, set-top box, game console or other device having at least one processor. In an embodiment, multiple modules may be implemented on the same processing device. Such a processing device may include software, firmware, hardware, or a combination thereof. Software may include one or more applications and an operating system. Hardware can include, but may not be limited to, a processor, memory, and/or graphical user display.

Reduction of Data Streaming

Data reduction computing device 110 may process real-time data captured by sensor system 130 so that only the real-time data required by the operator to adequately monitor the target area may be streamed to the operator. An embodiment consistent with the invention replaces the discarded real-time data with a three-dimensional virtual model which is a virtual representation of the target area. Data reduction computing device 110 may integrate the processed real-time data required by the operator to adequately monitor the target area with the three-dimensional virtual model of the target area. Data reduction computing device 110 may be located where the data is rendered to the operator so that the bandwidth occupied by the transmission of data between sensor system 130 positioned on the vehicle and to where the data is rendered to the operator is minimized.

For example, data reduction computing device 110 may be located on the ground when the operator is located on the ground and viewing the data rendered to the operator by display 140 which is also located on the ground. In another example, data reduction computing device 110 may be located on the vehicle when the operator is located on the vehicle and viewing the data rendered to the operator by display 140 which is also located on the vehicle. Although data reduction computing device 110 may occupy valuable space on the vehicle when the operator is also located on the vehicle, positioning data reduction computing device 110 in a location that is different from where the data is rendered to the operator may result in unnecessary bandwidth occupied by the streaming data. For example, streaming the data captured by sensor system 130 positioned on the vehicle down to the ground where data reduction computing device 110 is located and then back up to the vehicle where the data is rendered to the operator may occupy unnecessary bandwidth.

In an embodiment, data reduction computing device 110 may be associated with one or more vehicles. In such an embodiment each sensor system 130 associated with each one or more vehicles may capture data that is then processed so that the processed real-time data from the one or more vehicles is streamed to a single operator where data reduction computing device 110 is located. In another embodiment, one or more vehicles may be associated with one or more operators. In such an embodiment, each sensor system 130 associated with each one or more vehicles may capture data that is then processed so that the processed real-time data is streamed to one or more operators where one or more data reduction computing devices 110 are located. In an embodiment, each operator may be associated with a vehicle in that the operator associated with the vehicle views real-time data streamed specifically from the associated vehicle. In another embodiment, each operator may view real-time data streamed from each vehicle so that each operator views real-time data from multiple vehicles.

Figure 2:
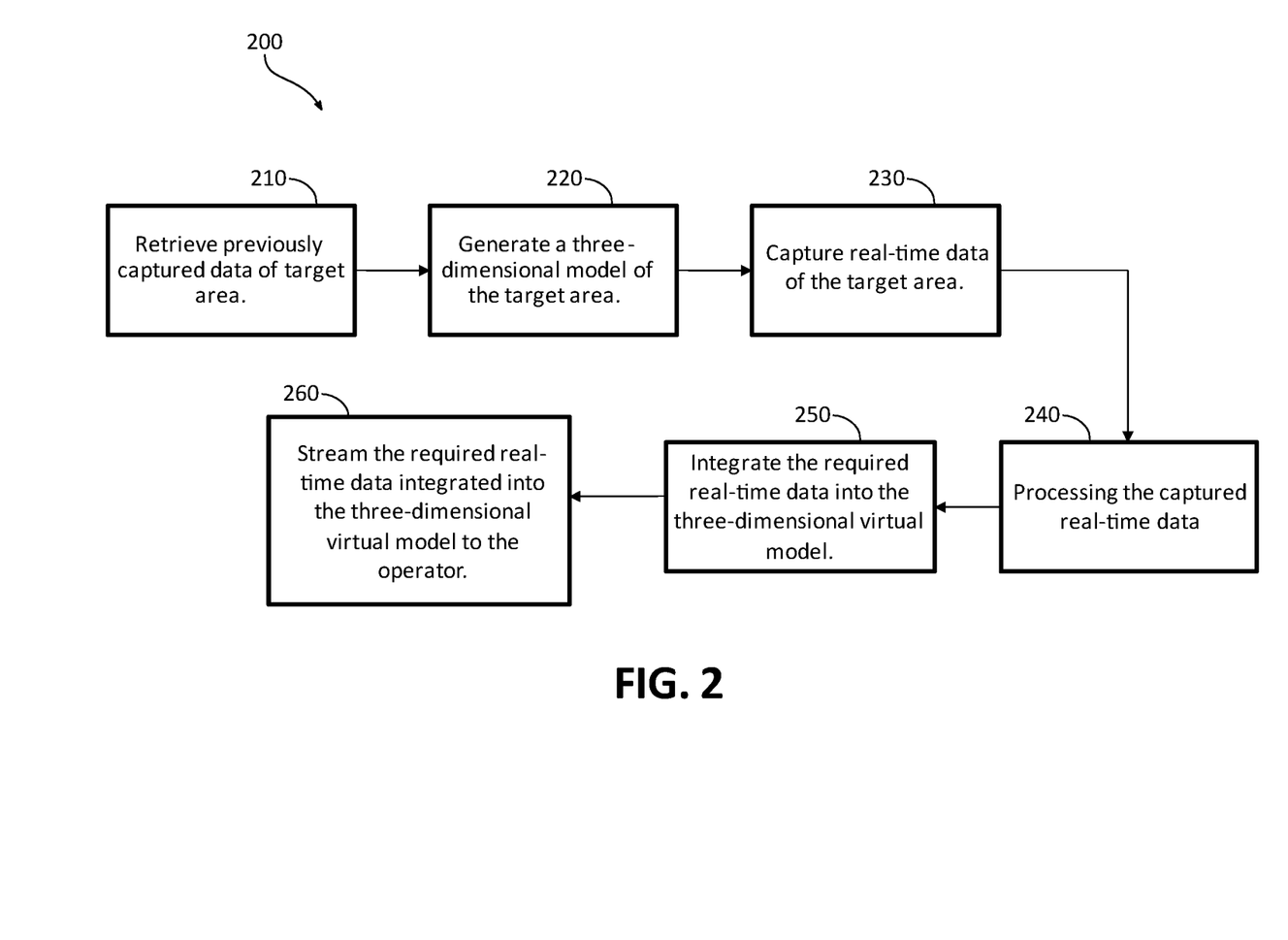
FIG. 2 is a flowchart showing an example method of reducing data streamed to the operator by incorporating a three-dimensional virtual model with the streamed data.

One such implementation of reducing data streamed to the operator by incorporating a three-dimensional virtual model with the streamed data is illustrated by process 200 in FIG. 2. Process 200 includes six primary steps: retrieve previously captured data of target area 210, generate a three-dimensional model of the target area 220, capture real-time data of the target area 230, process the captured real-time data 240, integrate the required real-time data into the three-dimensional virtual model 250, and stream the required real-time data integrated into the three-dimensional virtual model to the operator 260. Steps 210-260 are typically implemented in a computer, e.g., via software and/or hardware, e.g., data reduction computing device 110 of FIG. 1.

Figure 3:
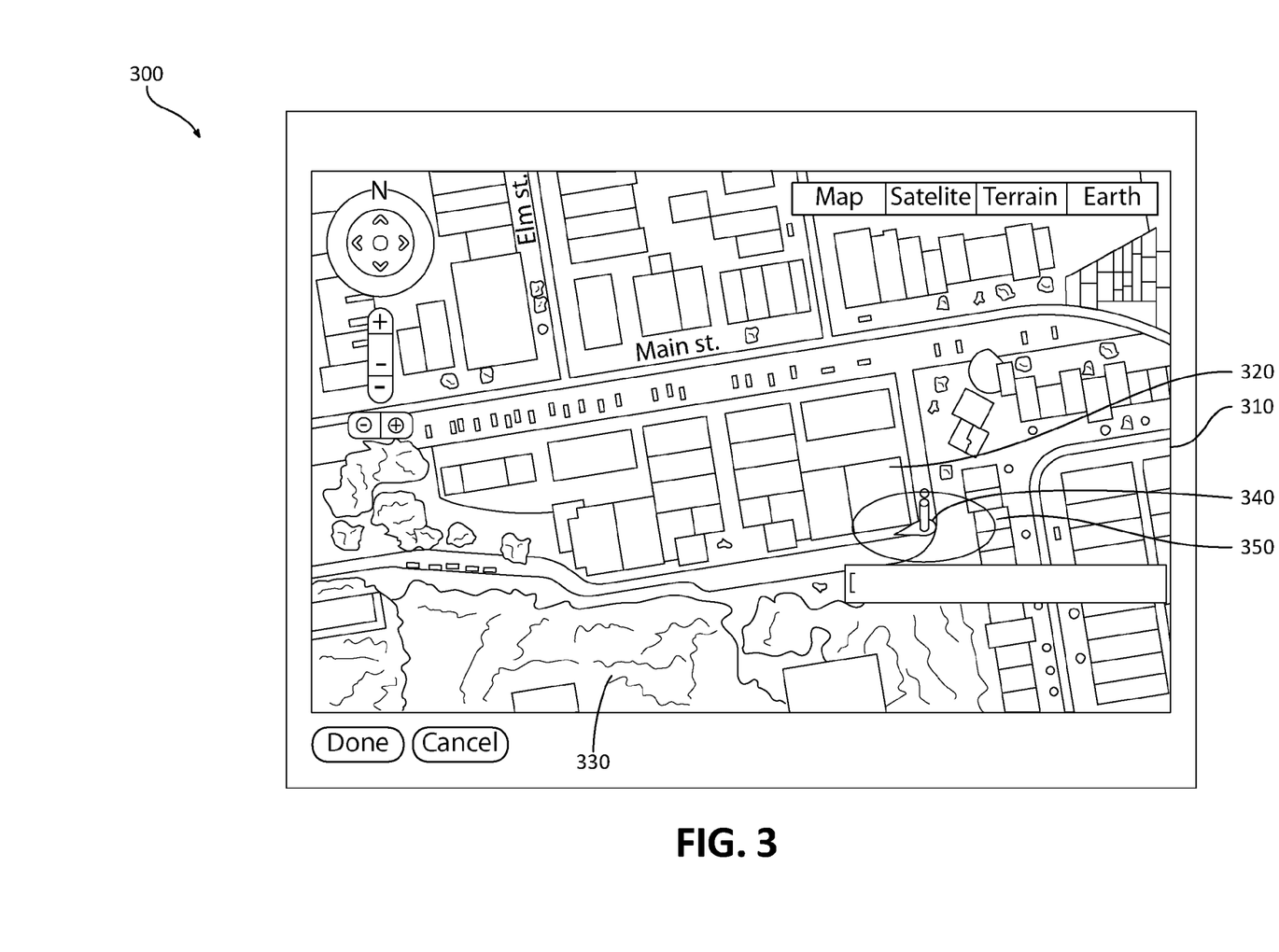
FIG. 3 is a diagram illustrating an example user interface that displays a target area that the operator may monitor.

FIG. 3 is a diagram illustrating an example user interface 300 displayed by display 140 of a target area that the operator may monitor. User interface 300 includes target area 310, first physical terrain 320, second physical terrain 330, tracking target 340, and tracking target threshold 350. FIG. 3 depicts a top-down orthographic projection of the three-dimensional virtual model generated by data reduction computing device 110. However, the three-dimensional virtual model generated by data reduction computing device 110 may be a projected three-dimensional virtual model that includes a full perspective of the environment that the three-dimensional virtual model depicts.

The operator may monitor the target area based on user interface 300 that is displayed to the operator via display 140. User interface 300 may display target area 310 to the operator for the operator to monitor. For example, user interface 300 may display target area 310 to the operator based on aerial footage captured by a UAV. Target area 310 is an urban neighborhood with first physical terrain 320 and second physical terrain 330. First physical terrain 320 is a city block of buildings. Second physical terrain 330 is a city block of trees. The operator monitors target area 310 to track tracking target 340. Tracking target 340 is surrounded by a tracking target threshold 350 that is a designated area circumventing tracking target 340 that is also of interest to the operator. As tracking target 340 moves through target area 310, user interface 300 displays that movement to the operator.

In step 210, previously captured data of the target area may be retrieved from previously captured data database 190 to generate the three-dimensional virtual model of the target area. Previously captured data database 190 may also be located where the data is rendered to the operator. For example, previously captured data database 190 may be located on the ground when the data is rendered to the operator on the ground. In another example, previously captured data database 190 may be located on the vehicle when the data is rendered to the operator on the vehicle.

The previously captured data retrieved from previously captured data database 190 may depict an actual representation of the target area at the time the data was captured. In an embodiment, previously captured data database 190 may include previously captured data of the target area that was captured by sensor system 130. The data captured by sensor system 130 of the target area may be stored in previously captured data database 190 for generation of the three-dimensional virtual model. Previously captured data captured by sensor system 130 and stored in previously captured data database 190 may include but not limited to video feeds, still-frame photographs, air quality levels, temperature levels, magnetic field levels and/or any other data captured by sensor system 130 of the target area that will be apparent from those skilled in the relevant art(s) without departing from the spirit and scope of the present disclosure.

In another embodiment, previously captured data database 190 may include previously captured data of the target area that was captured by other entities independent from sensor system 130. For example, previously captured data database 190 may include data captured by a government operated satellite of the target area that the government has authorized data reduction computing device 110 to retrieve for generation of the three-dimensional virtual model of the target area. Previously captured data of the target area that was captured by other entities independent from sensor system 130 may include but is not limited to satellite imagery, elevation data, satellite ephemerides, geographical boundaries, political boundaries, airborne captured Light Detection And Ranging (LIDAR) data, airborne captured Radio Detection And Ranging (RADAR) data and/or any type of previously captured data of the target area that was captured by other entities independent of sensor system 130 that will be apparent to those skilled in the relevant art(s) without departing from the spirit and scope of the present disclosure. In an example embodiment, step 210 may be performed by retrieving module 115 as shown in FIG. 1.

As noted above, the operator may not require that all of the data captured by sensor system 130 be streamed in real-time to the operator for the operator to adequately monitor the target area. The operator may not require that redundant data captured by a first sensor included in sensor system 130 and a second sensor in sensor system 130 be streamed in real-time to the operator. For example, the first sensor included in sensor system 130 may capture data that is an actual representation of first physical terrain 320. The second sensor included in sensor system 130 may also capture data that is an actual representation of first physical terrain 320. As a result, the redundant data of first physical terrain 320 captured by the second sensor is not required by the operator to adequately monitor the target area.

The operator may also be familiar with the physical terrain of the target area so that data captured of the physical terrain and streamed in real-time to the operator may no longer be required for the operator to adequately monitor the target area. Physical terrain of the target area may remain unchanged over time. After the operator has become experienced with the physical terrain of the target area, the operator may no longer require that real-time data of the physical terrain be streamed in real-time. For example, the operator is experienced in monitoring target area 310. The operator is familiar with first physical terrain 320 that represents the city block of buildings and second physical terrain 330 that represents the city block of trees. The city block of buildings and the city block of trees remain unchanged. The operator no longer requires real-time streaming of data of the city block of buildings and the city block of trees to adequately monitor target area 310.

Although the operator may not require real-time data of the physical terrain be streamed in real-time, the operator may require a visual representation of the physical terrain as the operator monitors the target area. In step 220, a three-dimensional virtual model of the target area may be generated. The three-dimensional virtual model of the target area may be generated based on previously captured data of the target area. The previously captured data may depict an actual representation of the target area at the time the previously captured data was captured. Thus, the three-dimensional virtual model may also depict a virtual representation of the target area at the time the previously captured data was captured. The three-dimensional virtual model may depict a virtual representation of buildings, trees, power lines, natural gas pumps, birds, vehicles, people, temperature, physical terrain included in the target area, rural farming field, an air strip, a no-fly zone, an oil field, a mountain, a body of water, geographical boundaries, political boundaries, hot zones, safe zones and/or any other visual representation of the target area that will be apparent to those skilled in the relevant art(s) without departing from the spirit and scope of the present disclosure.

The three-dimensional virtual model may also emphasize to the operator of any constraints included in the target area. The three-dimensional virtual model may display large icons that float in the three-dimensional virtual model so that the operator may be aware of the constraints included in the target area. For example, rather than have a line displayed in the three-dimensional virtual model that represents a state boundary, three-dimensional virtual model may display a large floating billboard that clearly identifies to the operator that the vehicle is approaching the state boundary. The three-dimensional virtual model may display large icons identifying constraints included in the target area that include but not limited to no-fly zones, geographical boundaries, political boundaries, hot zones, safe zones, and/or any other constraint included in the target area that will be apparent to those skilled in the relevant art(s) without departing from the spirit and scope of the present disclosure.

The three-dimensional virtual model of the target area may provide an accurate representation of the target area as the operator monitors the target area. The display of three-dimensional virtual model displayed to the operator via user interface 300 may dynamically change as the vehicle maneuvers throughout the target area in a similar fashion as when the real-time data is displayed by user interface 300. For example, the three-dimensional virtual model depicting first physical terrain 310 and second physical terrain 330 displayed to the operator via user interface 300 dynamically changes as the UAV maneuvers through target area 310.

Thus, the three-dimensional virtual model serves as a coherent and/or concise unifying framework to the operator and/or provides the operator with an adequate awareness of the target area for the operator to adequately monitor the target area. The three-dimensional model eliminates blind-spots that the vehicle may have encountered when capturing real-time data that may have presented gaps in the real-time data viewed by the operator. The three-dimensional virtual model provides weather independent viewing to the operator so that monitoring of the target area is not obstructed by weather conditions. The three-dimensional virtual model provides the adequate awareness of the target area to the operator while requiring significantly less bandwidth from network 120 than the streaming of actual data of the target area in real-time to the operator. In an example embodiment, step 220 may be performed by generation module 160 as shown in FIG. 1.

In step 230, data may be captured by the sensors located in sensor system 130. In an embodiment, the captured data may be real-time data of the target area that is to be streamed in real-time to the operator. The captured real-time data and then streamed in real-time to the operator may be an actual representation of the target in area in real-time. In another embodiment, the captured data of the target area as captured by sensor system 130 may be stored in previously captured data database 190. The data captured and then stored in previously captured data database 190 may be no longer considered real-time data. The captured data may depict an actual representation of the target area at the time the data was captured. The lapse in time from when the data was captured and when the operator analyzes the data may cause the captured data to no longer be a real-time representation of the target area. In an example embodiment, step 230 may be performed by capturing module 240 as shown in FIG. 1.

As noted above, the three-dimensional virtual model may be generated to replace the captured data that may not be required by the operator to adequately monitor the target area. Although the three-dimensional virtual model may replace a significant portion of the captured data captured of the target area, the operator may require a portion of the data to be streamed in real-time to the operator for the operator to adequately monitor the target area.

Returning to FIG. 3, the operator may desire to focus on tracking target 340. First physical terrain 320 and second physical terrain 330 may not be of interest to the operator. Rather than streaming data in real-time to the operator of first physical terrain 320 and second physical terrain 330, first physical terrain 320 and second physical terrain 330 may be adequately presented to the operator via the three-dimensional virtual model of target area 310. However, a three-dimensional virtual model of tracking target 340 may not be sufficient for the operator to adequately monitor tracking target 340. The operator may require that the captured data of tracking target 340 be streamed in real-time to the operator.

For example, the operator monitors the target area based on user interface 300 that is displayed to the operator via display 140. User interface 300 displays target area 310 to the operator based on aerial footage captured by a UAV. Target area 310 is an urban neighborhood that has a high level of drug trafficking that takes place in the urban neighborhood. Target area 310 includes first physical terrain 320 and second physical terrain 330. First physical terrain 310 is a city block of buildings. Second physical terrain is a city block of trees. The operator is experienced in monitoring the urban neighborhood and does not require that real-time data capturing the city block of buildings and the city block of trees be streamed in real-time to the operator. Rather, providing the operator with the three-dimensional virtual model of the city of block of buildings and the city block of trees is sufficient for the operator to monitor the urban neighborhood.

The operator identifies tracking target 340 that is a suspicious van that is travelling through the urban neighborhood. Because the van is travelling in real-time, any type of three-dimensional virtual model that may be generated that includes the van is not sufficient for the operator to adequately track the van. Any type of three-dimensional virtual model that includes the van is an actual representation of the time when data of the van was captured which is not real-time data of the van as the van travels through the urban neighborhood. As a result, the operator requires real-time data of the van to be streamed to the operator in real-time but does not require that real-time data of the city block of trees and the city block of buildings be streamed to the operator in real-time. In an example embodiment, step 230 may be performed by capturing module 125 as shown in FIG. 1.

In step 240, the captured real-time data may be processed based on process parameters to determine whether the captured real-time data should be streamed in real-time to the operator. Captured real-time data that satisfies the process parameters may be streamed in real-time to the operator while the captured real-time data that does not satisfy the process parameters may not be streamed in real-time to the operator. Each process parameter may be application specific and updated at any time by the operator to accommodate dynamic requirements. For example, a minimum tracking radius may be set as a process parameter when the operator is monitoring an area that is highly populated with people. The operator may want to track vehicles in the highly populated area while excluding the high population of people. The process parameter may be set for a minimum tracking radius that is large enough to include real-time data that tracks a car and is streamed in real-time to the operator while refraining from streaming real-time data that tracks a person.

In an embodiment, the real-time data that does not satisfy the process parameters may be discarded. In another embodiment, the real-time data that does not satisfy the process parameters may be stored in previously captured data database 190. In yet another embodiment, the real-time data that does not satisfy the process parameters may be stored for later analysis by the operator.

The process parameters may be pre-determined before real-time data of the target area is captured. The process parameters may also be adjusted in real-time by the operator while data of the target area is captured. For example, a UAV is scheduled to capture aerial data from three different target areas in a single aerial mission. The UAV is scheduled to fly over an oil field, a river bank, and then over a corn field. The operator of the UAV may set the process parameters before the UAV departs to stream real-time data to the operator of the oil pumps located in the oil field based on the global positioning system (GPS) coordinates of each oil pump, of the river based on GPS coordinates of the river, and a road located in the corn field based on GPS coordinates of the road. As the UAV reaches the corn field, night time has fallen. The operator observes fires in the corn field. As a result, the operator adjusts in real-time the process parameters to stream real-time data of the fires to the operator.

In another example, the process parameters may process out invalid GPS signals that are generated by an unknown entity in an attempt to compromise the mission of the UAV. Rather than specified satellites providing legitimate GPS coordinates that represent their actual location relative to the UAV, an unknown entity generates invalid GPS coordinates that differ from the actual locations of the specified satellites in an attempt to confuse the UAV. The process parameters may be adjusted in real-time to incorporate GPS spoofing to process out the invalid GPS coordinates.

In performing the GPS spoofing, the current location of the UAV based on the current latitude, longitude, and azimuth coordinates of the UAV may be determined. The GPS coordinates of the specified satellites that are received by the UAV relative to the UAV's current location may be confirmed based on information provided by an auxiliary database sponsored by NASA. The auxiliary database stores the location for every satellite within a twenty-four hour period. This auxiliary database may be queried to determine the actual location of the satellites being reference by the UAV. The GPS coordinates received by the UAV for the specified satellites that are not similar to the GPS coordinates queried from the auxiliary database for the specified satellites may be processed out as invalid GPS coordinates. In another embodiment, the process parameters may incorporate GPS jamming by processing out invalid GPS coordinates received by sensor system 130 that are associated with specified satellites by comparing the invalid GPS coordinates with previously received GPS coordinates associated with the specified satellites.

Process parameters may include but are not limited to zone boundaries within the target area, a listing of known assets present in the target area, redundant data captured between sensors, landing zone boundaries, air strip boundaries, flight route of the vehicle, signal loss of data, GPS jamming of the data, GPS spoofing of the data, GPS coordinates of the target, a physical size of the target and/or any other type of process parameter of captured data of the target area that will be apparent to those skilled in the relevant art(s) without departing from the spirit and scope of the present disclosure. In an example embodiment, step 240 may be performed by processing module 250 as shown in FIG. 1.

After captured real-time data that satisfies the process parameters and should be streamed in real-time to the operator is determined, in step 250, the processed real-time data may be integrated into the three-dimensional virtual model of the target area. The processed real-time data may be integrated into the three-dimensional virtual model such that the operator views the real-time data streaming in real-time with the three-dimensional virtual model via display 140. The display of the real-time data streamed to the operator in real-time may dynamically change with the three-dimensional virtual model as the real-time data dynamically changes.

Returning to FIG. 3, the movement of tracking target 340 may be streamed in real-time to the operator while first physical terrain 320 and second physical terrain 350 may be replaced by a three-dimensional virtual model that depicts first physical terrain 320 and second physical terrain 350. As tracking target 340 moves throughout target area 310, the display of real-time streaming of tracking target 340 moving throughout target area 310 to the operator via user interface 300 may dynamically change as the tracking target 340 moves past first physical terrain 320 and second physical terrain 350. The display of the three-dimensional virtual model of first physical terrain 320 and second physical terrain 350 may also dynamically change relative to the movement of tracking target 340. As a result, the operator observes an accurate representation of where in target area 310 the tracking target 340 may be located relative to first physical terrain 320 and second physical terrain 350.

The processed real-time data may be overlaid onto the three-dimensional virtual model. In an embodiment, real-time video of tracking target 340 may be overlaid onto the three-dimensional virtual model of first physical terrain 320 and second physical terrain 350. The operator may dynamically observe the real-time video of tracking target 350 overlaid on the three-dimensional virtual model of first physical terrain 320 and second physical terrain 350 as tracking target 340 maneuvers past first physical terrain 320 and second physical terrain 350.

In another embodiment, tracking target 340 may be iconified so that the icon of tracking target 340 may be overlaid onto the three-dimensional virtual model of first physical terrain 320 and second physical terrain 350. A still-framed photograph captured of tracking target 340 may be integrated with the three-dimensional virtual model and streamed in real-time to the operator. The operator may observe the still-framed photograph of tracking target 340 maneuver past the three-dimensional virtual model of first physical terrain 320 and second physical terrain 350.

In yet another embodiment, an icon stored in previously captured data database 190 of tracking target 340 may be overlaid onto the three-dimensional virtual model of first physical terrain 320 and second physical terrain 350. The icon may be a previously captured still-framed photograph of tracking target 340. In such an embodiment, the GPS coordinates of tracking target 340 may be integrated in real-time to user interface 300. User interface 300 may display to the operator the movement of the still-framed photograph of tracking target 340 as tracking target 340 maneuvers past first physical terrain 320 and second physical terrain 340 based on the GPS coordinates of tracking target 340 streamed in real-time to the operator. As the GPS coordinates of tracking target 340 change in real-time, the movement of tracking target 340 displayed by user interface 300 to the operator changes in real-time relative to the three-dimensional virtual model of first physical terrain 320 and second physical terrain 340.

Real-time video feed, real-time still-frame photographs, real-time air quality levels, real-time temperature levels, real-time magnetic field levels, stored video feed, stored still-frame photographs, stored air quality levels, stored temperature levels, stored magnetic field levels and/or any other data may be overlaid onto the three-dimensional virtual model that will be apparent from those skilled in the relevant art(s) without departing from the spirit and scope of the present disclosure. In an example embodiment, step 250 may be performed by integration module 270 as shown in FIG. 1.

After the processed real-time data is integrated into the three-dimensional virtual model, in step 260, the real-time data integrated with the three-dimensional virtual model may be streamed to display 140 for the operator to observe. Because the real-time data has been processed, the amount bandwidth occupied by the real-time data integrated with the three-dimensional virtual model that is streamed to display 140 may be minimized. As a result, the real-time data integrated with the three-dimensional virtual model may be streamed to the operator using the bandwidth provided by receivers and/or transmitters already located on the vehicle so that additional equipment is not required to support any additional bandwidth requirements. The real-time data integrated with the three-dimensional virtual model may be streamed to the operator using Ethernet, Fast Ethernet, Gigabit Ethernet, virtual private network (VPN), remote VPN access, a variant of IEEE 802.11 standard such as Wi-Fi, point-to-point link, point-to-multipoint link, cellular Third Generation (3G) wireless network, cellular Fourth Generation (4G) wireless network point-to-point link, point-to-multipoint link, cellular Third Generation (3G) wireless network, cellular Fourth Generation (4G) wireless network, and/or any other communication methodology so that the operator may adequately track tracking target 340 that will be apparent from those skilled in the relevant art(s) without departing from the spirit and scope of the present disclosure.

In an embodiment, real-time data of tracking target 340 may be automatically streamed to display 140 when tracking target 340 satisfies the process parameters. As a result, the operator does not have to manually determine whether to track tracking target 340 based on when the operator manually identifies tracking target 340 as a target the operator would like to track. Rather, real-time video of tracking target 340 may automatically begin streaming to display 140 when tracking target 340 satisfies the process parameters. For example, before the mission commences, the operator may specify in the process parameters to automatically begin streaming real-time video to display 140 when a red car is detected. Until the red car is detected, the vehicle is operating in a low power mode and occupying little bandwidth. However, once the red car is detected, the vehicle goes into operational mode and automatically begins to stream real-time video of the red car to display 140.

In another embodiment, rather than streaming real-time video of tracking target 340 that satisfies the process parameters, an icon that represents tracking target 340 along with the GPS coordinates of tracking target 340 may be automatically streamed to display 140 when tracking target 340 satisfies the process parameters. In automatically streaming an icon representing tracking target 340 and the GPS coordinates of tracking target 340 to display 140, the bandwidth occupied by the streaming is even further reduced. Rather than streaming real-time video of tracking target 340, the real-time video of tracking target 340 is replaced with an icon representing tracking target 340 that moves throughout the three-dimensional virtual model based on the GPS coordinates of tracking target 340 that are streamed to display 140. As a result, the operator may track the movement of the icon representing tracking target 340 in real-time based on the GPS coordinates of tracking target 340 that are streamed to display 140.

The streaming of processed real-time data to display 140 rather than substantially all of the real-time data captured by sensor system 130 may relieve the operator of having to navigate the vehicle throughout the target area. The streaming of processed real-time data may also relieve the operator of having to search for potential targets to track. The operator may focus on analyzing real-time data that has satisfied the process parameters rather than sifting through substantially all of the real-time data captured by sensor system 130. Thus, the workload of the operator may be reduced and may prolong the endurance of the operator and/or reduce the need of additional operators to monitor the target area. In an example embodiment, step 260 may be performed by streaming module 180 as shown in FIG. 1.

Exemplary Embodiments

The integration of processed real-time data that may be streamed in real-time to the operator with the three-dimensional virtual model to reduce the amount of real-time data that is streamed to the operator as discussed in detail above may be applied in several applications. The applications may include but not limited to tracking military targets, tracking criminal activity, identifying natural gas leakages from natural gas mines, identifying damaged power lines, certifying a no-fly zone around air strip, and/or any other data gathering application that will be apparent from those skilled in the relevant art(s) without departing from the spirit and scope of the present disclosure.

For example, the integration of processed real-time data streamed in real-time to the operator with the three-dimensional virtual model may be applied to monitoring natural gas mines. Natural gas mines are remote locations where natural gas may be extracted from the earth. Leakage of natural gas into the atmosphere from natural gas mines poses a significant risk to the atmosphere. As a result, the natural gas mines have to be monitored for leakage into the atmosphere so that the leaks may be addressed. Conventionally, an operator is required to drive out to each remote natural gas mine to ensure natural gas is not leaking into the atmosphere.

Rather than having the operator drive out to each remote natural gas mine, a UAV may be equipped with air sensors that can detect natural gas leakage into the atmosphere. The operator of the UAV that is monitoring each natural gas mine for natural gas leakage into the atmosphere may not require real-time video footage of terrain surrounding the natural gas mine and the natural gas mine itself be streamed to the operator in real-time. Rather, the operator may simply require notification of any natural gas leakage and the GPS coordinates of where the natural gas leakage may be occurring. As a result, an on-board camera system coupled to the UAV may be replaced with air sensors.

The three-dimensional virtual model that depicts the physical terrain of the natural gas mine may replace real-time video footage of the natural gas mine. Any real-time data representing the natural gas leakage detected by the air sensors may be also be processed out so that only the GPS coordinates of the natural gas leakage may be streamed to the operator in real-time so that the operator may identify the location of the natural gas leak. All of the other data captured by the UAV, such as data representing the physical terrain, may be adequately replaced by the three-dimensional virtual model. As a result, a third-generation modem may be sufficient to stream the data to the operator rather than a robust communications network.

In another example, the integration of processed real-time data streamed in real-time to the operator with the three-dimensional virtual model may be applied to monitoring power lines. Power lines transport large quantities of power from a power plant that originates the power to homes and businesses that receive the power. Power lines are often times damaged in storms. Damaged power lines pose a significant risk in injuring individuals who come into contact with the damaged power lines and/or to causing fires. As a result, damaged power lines have to be identified so that the damaged power lines can be repaired. Conventionally, a pilot of a helicopter maneuvers the helicopter around to visually identify damaged power lines.

Rather than having the pilot maneuver a helicopter to visually identify damaged power lines, a UAV may be equipped with technology capable of sensing electromagnetic energy levels emitted by the power lines. After the power lines are damaged, the power lines may no longer emit electromagnetic energy so that the electromagnetic energy levels emitted by the power lines drop significantly. The operator of the UAV that is searching for damaged power lines may not require real-time video footage of the physical terrain surrounding the power lines be streamed to the operator in real-time. The physical terrain may be adequately represented by a three-dimensional virtual model of the physical terrain so that data representing the physical terrain may be processed out and not streamed in real-time to the operator. The operator may also not require real-time video footage of the power lines themselves be streamed to the operator and may also be processed out and not streamed in real-time to the operator. Rather, GPS coordinates representing where the electromagnetic energy levels of the power lines have dropped below a threshold may be streamed to the operator so that the operator may detect where the power lines have been damaged.

In another example, the integration of processed real-time data streamed in real-time to the operator with the three-dimensional virtual model may be applied to certifying a no-fly zone around an airport. The Federal Aviation Administration (FAA) requires that each year an airport certifies that an adequate no-fly zone circumvents the airport. The certification requires that the airport show that incursions such as trees and/or buildings that could interfere with the taking off and/or landing of airplanes are not within the no-fly zone circumventing the airport as required by the FAA. LIDAR may be used to determine whether incursions are within the no-fly zone. LIDAR provides high resolution data that is difficult to stream to an operator in real-time. Typically, LIDAR data is stored after the LIDAR data is captured and then processed later for analysis.

Rather than streaming the LIDAR data to the operator in real-time, the LIDAR data may be processed so that only the GPS coordinates of detected incursions within the no-fly zone may be streamed in real-time to the operator. The operator may then decide to maneuver the UAV back over the area of the no-fly zone that detected the incursions to determine whether the incursions still exist. If GPS coordinates of incursions are streamed back to the operator in real-time that that are substantially different than the GPS coordinates previously streamed back to the operator when flying over the no-fly zone a second time, then it is likely the incursion is gone and was not a permanent incursion. The incursion may have been a flock of birds that moved out of the no-fly zone. However, if GPS coordinates that are substantially similar to the GPS coordinates previously streamed to the operator in real-time when flying over the area a second time, then it is likely that the incursion is a permanent structure that needs to be removed from the no-fly zone.

In another embodiment, multiple UAVs flying within proximity of each other may share their bandwidth capabilities in streaming the processed real-time data to the operator and/or operators. In such an embodiment, each UAV may be customized with its own process parameters so that each UAV detects different targets and processes the remaining data so that only the real-time data of the targets are streamed. A single UAV may be designated as the mother ship where the single UAV has the bandwidth capabilities to stream the processed real-time data captured by each individual UAV to the operator and/or operators when each individual UAV is within proximity of the mother ship. Each individual UAV is within proximity of the mother ship when each individual UAV is within a distance of the mother ship to adequately transmit the processed real-time data to the mother ship. The mother ship may then stream the processed real-time data to the operator and/or operators. The mother ship may stream the processed real-time data to a single operator where the single operator analyzes the processed real-time data captured by each individual UAV. The mother ship may also stream the processed real-time data to multiple operators where each operator analyzes the processed real-time data captured by a single UAV.

Embodiments can work with software, hardware, and/or operating system implementations other than those described herein. Any software, hardware, and operating system implementations suitable for performing the functions described herein can be used. Embodiments are applicable to both a client and to a server or a combination of both.

The breadth and scope of the present disclosure should not be limited by any of the above-described example embodiments, but should be defined only in accordance with the following claims and their equivalents.

What is claimed is:

1. A method for reducing an amount of data captured by at least one of a plurality of sensors located on a vehicle that is streamed to an operator of the vehicle, comprising:
   retrieving previously captured data of a target area from a previously captured data database, wherein previously captured data depicts an actual representation of the target area when previously captured data was captured;
   generating a three-dimensional virtual model of the target area from the previously captured data, wherein the three-dimensional virtual model is a virtual representation of the target area;
   capturing real-time data of the target area captured by the plurality of sensors located on the vehicle, wherein real-time data provides the actual representation of the target area in real-time;
   processing the real-time data to distinguish required real-time data that satisfies a plurality of process parameters from unnecessary real-time data that fails the plurality of process parameters;
   discarding unnecessary real-time data captured by a first sensor that is redundant to the required real-time data captured by a second sensor;
   discarding the unnecessary real-time data captured by the plurality of sensors that is redundant to the previously captured data included in the previously captured data database;
   integrating the required real-time data into the three-dimensional virtual model; and
   streaming only the required real-time data integrated into the three-dimensional virtual model to the operator of the vehicle.

2. The method of claim 1, wherein the previously captured data provides a depiction of physical terrain included in the target area.

3. The method of claim 1, further comprising:
   determining the plurality of process parameters before the vehicle embarks on a data capturing mission of the target area; and
   adjusting the plurality of process parameters in real-time as the vehicle is executing the data capturing mission of the target area.

4. The method of claim 1, wherein the retrieving comprises:
   retrieving previously captured data from the previously captured data database that includes data previously captured by the vehicle when executing previous data capturing missions; and
   retrieving previously captured data from the previously captured data database that includes data previously captured by a data capturing entity independent from the vehicle.

5. The method of claim 1, wherein the integrating comprises:
   overlaying the required real-time data onto at least one icon included in the three-dimensional virtual model that is associated with the required real-time data; and position the at least one icon included in the three-dimensional model based on the required real-time data that is associated with the at least one icon.

6. The method of claim 1, wherein the integrating further comprises:
mathematically transforming the real-time data into a single reference frame that is integrated into the single reference frame of the three-dimensional virtual model.

7. The method of claim 1, wherein the required real-time data that satisfies the plurality of process parameters includes global positioning system (GPS) coordinates associated with a gas leakage of natural gas from a natural gas mine.

8. The method of claim 1, wherein the required real-time data that satisfies the plurality of process parameters includes GPS coordinates associated with a decrease in electromagnetic levels associated with a power line that signifies a damaged location in the power line.

9. A system for reducing an amount of data captured by at least one of a plurality of sensors located on a vehicle that is streamed to an operator of the vehicle, comprising:
at least one processor; and
a memory coupled with the processor, the memory including instructions that, when executed by the processor cause the processor to:
retrieve previously captured data of a target area from a previously captured data database, wherein previously captured data depicts an actual representation of the target area when previously captured data was captured;
generate a three-dimensional virtual model of the target area from the previously captured data, wherein the three-dimensional virtual model is a virtual representation of the target area;
capture real-time data of the target area captured by the plurality of sensors located on the vehicle, wherein the real-time data provides the actual representation of the target area in real-time;
process the real-time data to distinguish required real-time data that satisfies a plurality of process parameters from unnecessary real-time data that fails the plurality of process parameters;
discard unnecessary real-time data captured by a first sensor that is redundant to the required real-time data captured by a second sensor;
discard the unnecessary real-time data captured by the plurality of sensors that is redundant to the previously captured data included in the previously captured data database;
integrate the required real-time data into the three-dimensional virtual model; and
stream only the required real-time data integrated into the three-dimensional virtual model to the operator of the vehicle.

10. The system of claim 9, wherein the previously captured data provides a depiction of physical terrain included in the target area.

11. The system of claim 9, wherein the instructions that when executed by the processor, further case the processor to:
determine the plurality of process parameters before the vehicle embarks on a data capturing mission of the target area; and
adjust the plurality of process parameters in real-time as the vehicle is executing the data capturing mission of the target area.

12. The system of claim 9, wherein the instructions that when executed by the processor, further cause the processor to:
retrieve previously captured data from the previously captured data database that includes data previously captured by the vehicle when executing previous data capturing missions; and
retrieving previously captured data from the previously captured data database that includes data previously captured by a data capturing entity independent from the vehicle.

13. The system of claim 9, wherein the instructions that when executed by the processor, further cause the processor to:
overlay the required real-time data onto each icon included in the three-dimensional virtual model that is associated with the required real-time data; and
position the at least one icon included in the three-dimensional model based on the required real-time data that is associated with the at least one icon.

14. The system of claim 9, wherein the instructions that when executed by the processor, further cause the processor to mathematically transform the real-time data into a single reference frame that is integrated into the single reference frame of the three-dimensional virtual model.

15. The system of claim 9, wherein the required real-time data that satisfies the plurality of process parameters includes global positioning system (GPS) coordinates associated with a gas leakage of natural gas from a natural gas mine.

16. The system of claim 9, wherein the required real-time data that satisfies the plurality of process parameters includes GPS coordinates associated with a decrease in electromagnetic levels associated with a power line that signifies a damaged location in the power line.

17. A non-transitory computer readable storage medium encoded with a computer program, the computer program comprising instructions that when executed by one or more processors cause the one or more processors to perform operations comprising:
retrieving previously captured data of a target area from a previously captured data database, wherein previously captured data depicts an actual representation of the target area when previously captured data was captured;
generating a three-dimensional virtual model of the target area from the previously captured data, wherein the three-dimensional virtual model is a virtual representation of the target area;
capturing real-time data of the target area captured by a plurality of sensors located on a vehicle, wherein real-time data provides the actual representation of the target area in real-time;
processing the real-time data to distinguish required real-time data that satisfies a plurality of process parameters from unnecessary real-time data that fails the plurality of process parameters;
discarding unnecessary real-time data captured by a first sensor that is redundant to the required real-time data captured by a second sensor;
discarding the unnecessary real-time data captured by the plurality of sensors that is redundant to the previously captured data included in the previously captured data database;
integrating the required real-time data into the three-dimensional virtual model; and streaming only the required real-time data into the three-dimensional virtual model to an operator of the vehicle.

18. The computer readable storage medium of claim 17, wherein the previously captured data provides a depiction of physical terrain included in the target area.

19. The computer readable storage medium of claim 17, further comprising:
  determining the plurality of process parameters before the vehicle embarks on a data capturing mission of the target area; and
  adjusting the plurality of process parameters in real-time as the vehicle is executing the data capturing mission of the target area.

20. The computer readable storage medium of claim 17, wherein the retrieving comprises:
  retrieving previously captured data from the previously captured data database that includes data previously captured by the vehicle when executing previous data capturing missions; and
  retrieving previously captured data from the previously captured data database that includes data previously captured by a data capturing entity independent from the vehicle.

21. The computer readable storage medium of claim 17, wherein the integrating comprises:
  overlaying the required real-time data into a single reference frame that is integrated into the single reference frame of the three-dimensional virtual model.

* * * * *